US008669867B2

United States Patent
Wei

(10) Patent No.: US 8,669,867 B2
(45) Date of Patent: Mar. 11, 2014

(54) MULTI-FUNCTION PRINTER AND ALARM METHOD THEREOF

(75) Inventor: Shu-Bin Wei, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 301 days.

(21) Appl. No.: 13/244,289

(22) Filed: Sep. 24, 2011

(65) Prior Publication Data

US 2013/0049959 A1    Feb. 28, 2013

(30) Foreign Application Priority Data

Aug. 26, 2011   (TW) .............................. 100130719 A

(51) Int. Cl.
*G08B 21/00* (2006.01)
(52) U.S. Cl.
USPC ....................................................... 340/540
(58) Field of Classification Search
USPC ......... 340/540, 691.6, 13.24, 539.1; 358/1.13
See application file for complete search history.

(56) References Cited

U.S. PATENT DOCUMENTS

| 8,233,172 B2 * | 7/2012 | Podl et al. ..................... 358/1.15 |
| 2005/0094193 A1 * | 5/2005 | Oswald ........................ 358/1.15 |
| 2010/0225962 A1 * | 9/2010 | Okigami et al. ............. 358/1.15 |
| 2010/0247201 A1 * | 9/2010 | Sasama ........................ 399/405 |

FOREIGN PATENT DOCUMENTS

| TW | M406526 | 7/2011 |
| WO | 2004096565 A2 | 11/2004 |
| WO | 2004096548 A3 | 1/2006 |

OTHER PUBLICATIONS

"Office Action of Taiwan Counterpart Application", issued on Jan. 9, 2014, p. 1-p. 3.

* cited by examiner

*Primary Examiner* — Phung Nguyen
(74) *Attorney, Agent, or Firm* — Jianq Chyun IP Office

(57) ABSTRACT

A multi-function printer (MFP) and an alarm method thereof are provided. The provided method includes determining whether the MFP has accomplished printing a document; and when the MFP has accomplished printing the document, determining whether to produce an alarm message to an electronic device corresponding to the document in response to a comparison result between an input speech and a database. Thus, in response to the generation of the alarm message, not only to warn a user who forgot to take away the printed document, but also further to indicate the location of the printed document.

17 Claims, 4 Drawing Sheets

MULTI-FUNCTION PRINTER AND ALARM METHOD THEREOF

CROSS-REFERENCE TO RELATED APPLICATION

This application claims the priority benefit of Taiwan application serial no. 100130719, filed Aug. 26, 2011. The entirety of the above-mentioned patent application is hereby incorporated by reference herein and made a part of this specification.

BACKGROUND OF THE INVENTION

1. Field of the Invention

The invention relates to an alarm technology, and particularly to a multi-function printer and an alarm method thereof.

2. Description of Related Art

With the coming of the information society, office automation equipments, for example, a scanner, a photocopier and a printer, are set/installed in an office, and a user can perform the word processing operation by using the office automation equipments. It should be noted that when the office automatic equipments are set/installed in the office at the same time, the office automation equipments may occupy much space. Therefore, a multi-function printer (MFP) integrating functions of photocopying, printing, and scanning is developed.

The flow process of performing printing in a conventional MFP is: the user first issues a print command by a computer, and then the MFP would perform printing in response to a print document transmitted from the computer. When the MFP receives multiple printing requests, the MFP would perform scheduling according to the sequence of printing requests, namely, operating under a first come first serve basis. Thus, users corresponding to the printing requests in the back of the order usually will not immediately go to the side of the MFP to wait the needed print document, but will go to the MFP to take away the needed print document after waiting for a period of time.

However, users corresponding to the printing requests in the back of the order may forget to take away the needed print document because of other occupying tasks. Thus, a pile of printed documents (papers) are usually piled up in the paper output region of the MFP. Even though user from remembering going to the MFP to take away the needed print document, because much of print documents are piled up in the paper output region of the MFP, so user can not easily find his or her own needed print document.

SUMMARY OF THE INVENTION

Accordingly, the invention provides a multi-function printer and an alarm method thereof, so as to effectively solve the problems recited in the "Description of Related Art".

The invention provides a multi-function printer (MFP). The MFP includes a print module and a speech recognition module. The print module is adapted to print a document. The speech recognition module is adapted to determine whether to produce an alarm message to an electronic device corresponding to the document in response to a comparison result between an input speech and a database when the document has finished/accomplished printing.

The invention also provides an alarm method applicable to a multi-function printer (MFP). The alarm method includes: determining whether the MFP has accomplished printing a document; and when the MFP has accomplished printing the document, determining whether to produce an alarm message to an electronic device corresponding to the document in response to a comparison result between an input speech and a database.

In an embodiment of the invention, the alarm message may be a default alarm message or a custom alarm message.

From the above, in the invention, by additionally equipping the speech recognition module into the MFP, when the MFP has accomplished printing a document and the printed document has not been taken away and is piled up in the paper output region of the MFP, in response to a satisfied condition of an input speech, a default alarm message can be automatically produced to the electronic device corresponding to the printed document, or a custom alarm message can be produced to the electronic device corresponding to the printed document from self-defining by user corresponding to the input speech. Thus, in response to the generation of the default/custom alarm message, not only to warn the user who forgot to take away the printed document (in this way, a situation that much of print documents/papers are piled up in the paper output region of the MFP can be mitigated), but also further to indicate the location of the printed document (in this way, user can easily find his or her printed document).

However, the above descriptions and the below embodiments are only used for explanation, and they do not limit the scope of the present invention.

BRIEF DESCRIPTION OF THE DRAWINGS

The following figures are a part of the specification of the invention, drawing an exemplary embodiment of the invention. The description of the figures and the specification together describe the principle of the invention.

DESCRIPTION OF EMBODIMENTS

Figure 1:
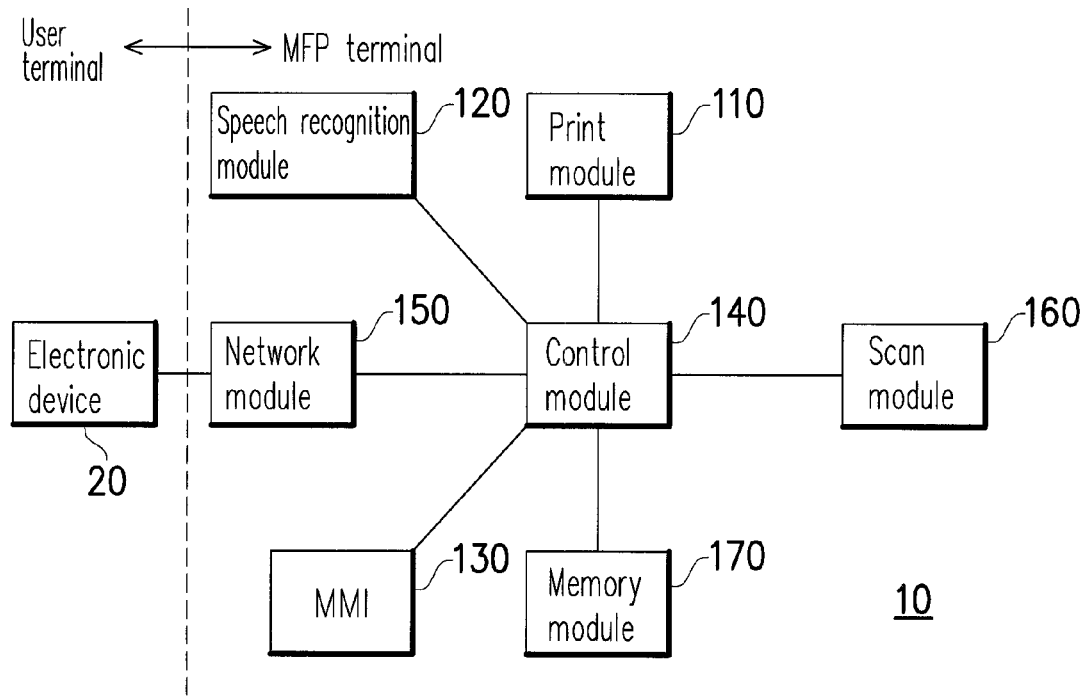
FIG. 1 is a schematic view of a MFP 10 according to an embodiment of the invention.

Descriptions of the invention are given with reference to the exemplary embodiments illustrated with accompanied drawings, wherein same or similar parts are denoted with same reference numerals. Moreover, elements/components/notations with same reference numerals represent same or similar parts in the drawings and embodiments.

FIG. 1 is a schematic view of a multi-function printer (MFP) 10 according to an embodiment of the invention.

Referring to FIG. 1, the MFP 10 includes a print module 110, a speech recognition module 120, a man-machine-interface (MMI) 130, a control module 140, a network module 150, a scan module 160, and a memory module 170. The control module 140 is served as an operation core of the MFP 10, so as to control and manage the whole operation of the MFP 10.

In the embodiment, when an electronic device 20 located at user terminal (for example, a desktop/laptop, a personal digital assistant (PDA), a smart phone, or other mobile devices, all of which have a network function) issues a print command to the MFP 10, the control module 140 would receive a print document transmitted from the electronic device 20 through the network module 150, so as to temporarily store the received print document in the memory module 170. Then, the control module 140 would control the print module 110 to print the print document temporarily stored in the memory module 170. The print document printed by the print module 110 is finally presented in the paper output region (not shown) of the MFP 10, and the execution information corresponding to the print document would also be stored in memory module 170, for example, the IP address of the electronic device that issued the print request, and the file name of the print document, where the file name is generally relating to the property of the print document.

In addition, when the user wants to use the MFP 10 to perform copying, the control module 140 would control the scan module 160 to perform scanning on a copy document in response to the user settings on the MMI 130 (such as a touch screen, but is not limited thereto), so as to obtain and temporarily store a scanned data in the memory module 170. Then, the control module 140 further controls the print module 110 to print the scanned data temporarily stored in the memory module 170. The scanned data printed by the print module 110 and corresponding to the copy document is finally presented in the paper output region of the MFP 10, and the execution information corresponding to the copy document would also be stored in the memory module 170.

Before the user wants to use the MFP 10 to perform copying, the user saw that a certain printed document has been presented in the paper output region of the MFP 10. In this condition, the user can input a key speech according to the property of the printed document, and then the inputted key speech is recognized by the speech recognition module 120 of the MFP 10, so as to determine whether to notify/remind user corresponding to the printed document for retrieval.

Figure 2:
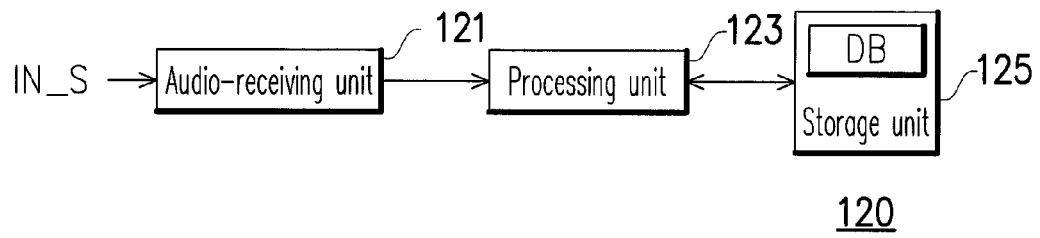
FIG. 2 is a schematic view of a speech recognition module 120 according to an embodiment of the invention.

In detail, FIG. 2 is a schematic view of the speech recognition module 120 according to an embodiment of the invention. Referring to FIG. 1 and FIG. 2, assuming the printed document (such as a form) left in the paper output region of the MFP 10 is corresponding to the print request issued by the electronic device 20 located at user terminal, then when the print module 110 has accomplished printing the form, the speech recognition module 120 may determine whether to produce an alarm message to the electronic device 20 corresponding to the form in response to a comparison result between an input speech IN_S and a database DB.

In the embodiment, the speech recognition module 120 includes an audio-receiving unit 121, a processing unit 123, and a storage unit 125. The storage unit 125 may be any type of non-volatile memory (such as flash memory, but is not limited thereto), and used to store database DB. The database DB records a plurality of keywords relating to the execution information stored in the memory module 170, namely, the IP address of the electronic device that issued the print request, and the file name of the print document, where the file name is generally relating to the property of the print document.

In addition, the audio-receiving unit 121 may be an omnidirectional microphone or a uni-directional microphone, and used to receive the input speech IN_S. Furthermore, the processing unit 123 is coupled to the audio-receiving unit 121 and the storage unit 125. The processing unit 123 may be a digital signal processor (DSP) with speech processing functions. The processing unit 123 is used to compare whether the input speech IN_S corresponds to one of the keywords stored in the database DB after the form has finished printing, so as to determine whether to produce the alarm message.

If the form printed by the print module 110 is "Finance Form", then user (for example user A) wanting to use the MFP 10 to perform copying can clearly know the property of the printed form. Thus, user A can input the input speech IN_S such as "finance", "form", or "finance form" towards the audio-receiving unit 121. Then, the processing unit 123 would start comparing the input speech IN_S with the keywords recorded in the database DB.

Figure 3:
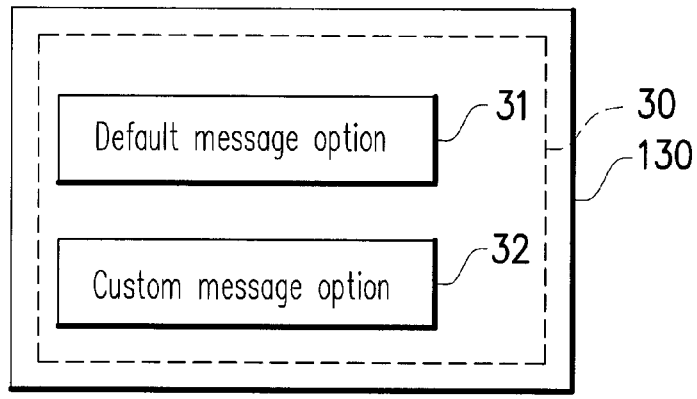
FIG. 3 is a schematic view of a selection window 30 provided by a MMI 130 according to an embodiment of the invention.

When the processing unit 123 compares that the input speech IN_S corresponds to one of the keywords recorded in the database DB, the processing unit 123 would know the electronic device 20 that issued the print request, accordingly, the processing unit 123 would obtain the IP address of the electronic device 20. After the processing unit 123 finds out the object that issued the print request, the control module 140 controls the MMI 130 to provide a selection window 30 (shown in FIG. 3) with a default message option 31 and a custom message option 32 for the user A to select.

Figure 4:
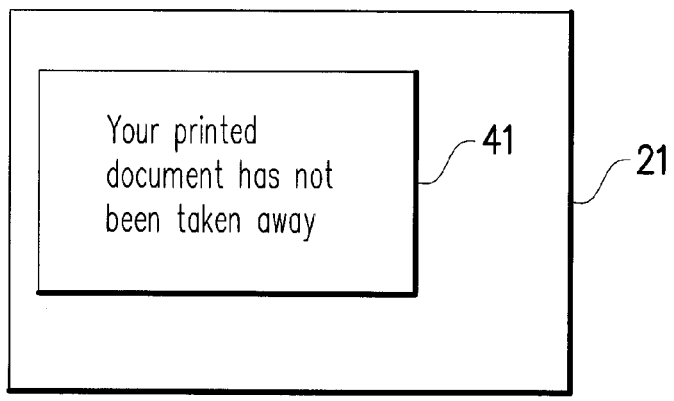
FIG. 4 is a schematic diagram of a default alarm message 41 displayed by an electronic device 20 according to an embodiment of the invention.

When user A selects the default message option 31, the processing unit 123 would automatically produce a default alarm message, and then the control module 140 would control the network module 150 to transmit the default alarm message to the electronic device 20 corresponding to the form in response to the generation of the default alarm message. Thus, the display screen 21 of the electronic device 20 would display a default alarm message 41 such as, "your printed document has not been taken away" (shown in FIG. 4), so as to notify/remind a user B corresponding to the form for retrieval.

Figure 5:
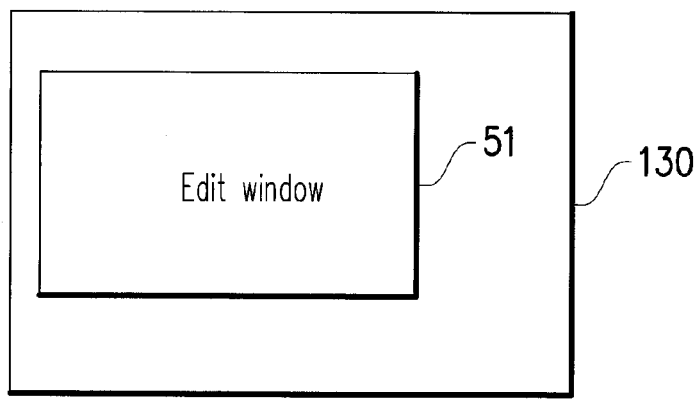
FIG. 5 is a schematic view of an edit window 51 provided by the MMI 130 according to an embodiment of the invention.
Figure 6:
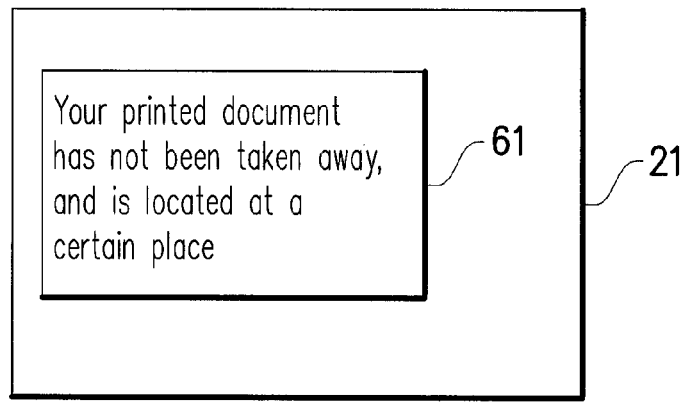
FIG. 6 is a schematic diagram of a custom alarm message 61 displayed by the electronic device 20 according to an embodiment of the invention.

When user A selects the custom message option 32, the control module 140 controls the MMI 130 to provide an edit window 51 (shown in FIG. 5) for user A to perform a message edit, and then the processing unit 123 would produce a custom alarm message after user A has finished/completed the message edit. Under this condition, the control module 150 would control the network module 150 to transmit the custom alarm message to the electronic device 20 corresponding to the form in response to the generation of the custom alarm message. Thus, the display screen 21 of the electronic device 20 would display a custom alarm message 61 such as, "your printed document has not been taken away, and is located at a certain place" (shown in FIG. 6), so as to notify/remind a user B corresponding to the form for retrieval.

Figure 7:
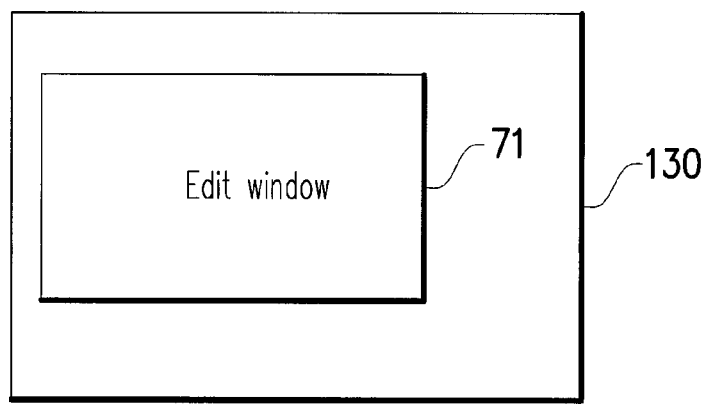
FIG. 7 is a schematic view of an edit window 71 provided by the MMI 130 according to another embodiment of the invention.
Figure 8:
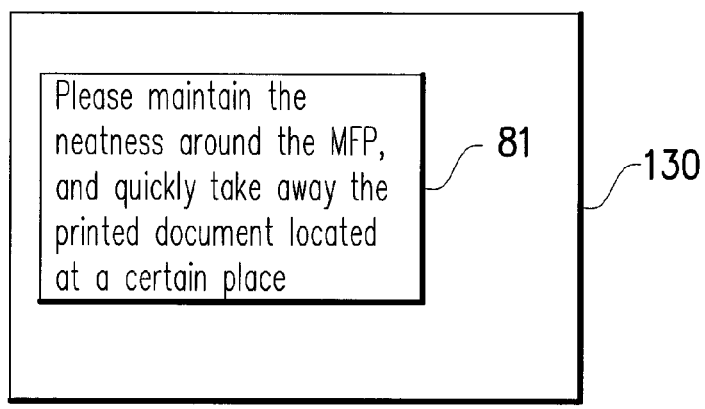
FIG. 8 is a schematic view of a message 81 displayed by the MMI 130 according to an embodiment of the invention.

On the other hand, when the processing unit 123 compares that the input speech IN_S does not correspond to any of the keywords recorded in the database DB, the control module 140 would control the MMI 130 to provide an edit window 71 (shown in FIG. 7) for user A to perform a message edit. After the user has finished/completed the message edit, the MMI 130 would display a message 81 such as "please maintain the neatness around the MFP, and quickly take away the printed document located at a certain place" (shown in FIG. 8) by a scrolling text style or a flickering style, so as to notify/remind all users using the MFP 10.

From the above, when the MFP has accomplished printing a document, and the printed document has not been taken away and is piled up in the paper output region of the MFP, the speech recognition module 120 of the embodiment may, in response to a satisfied condition of the input speech, automatically produce a default alarm message to the electronic device corresponding to the printed document, or may produce a custom alarm message to the electronic device corresponding to the printed document from self-defining by user corresponding to the input speech. Even, a message can be self-defined by user and displayed by the MFP 10 in response to a dissatisfied condition of the input speech. Accordingly, in response to the generation of the default/custom alarm message, or in response to the displayed message, not only to warn the user who forgot to take away the printed document (in this way, a situation that much of print documents/papers are piled up in the paper output region of the MFP 10 can be mitigated), but also further to indicate the location of the printed document (in this way, user can easily find his or her printed document).

It should be noted that the embodiment is described with an input speech as an example. In other embodiments of the invention, the input speech may instead be replaced by directly inputting keywords on the edit window provided by the MMI 130. Thus, the same effect can be achieved as in the previous embodiment, and the audio-receiving unit 121 can be omitted.

Figure 9:
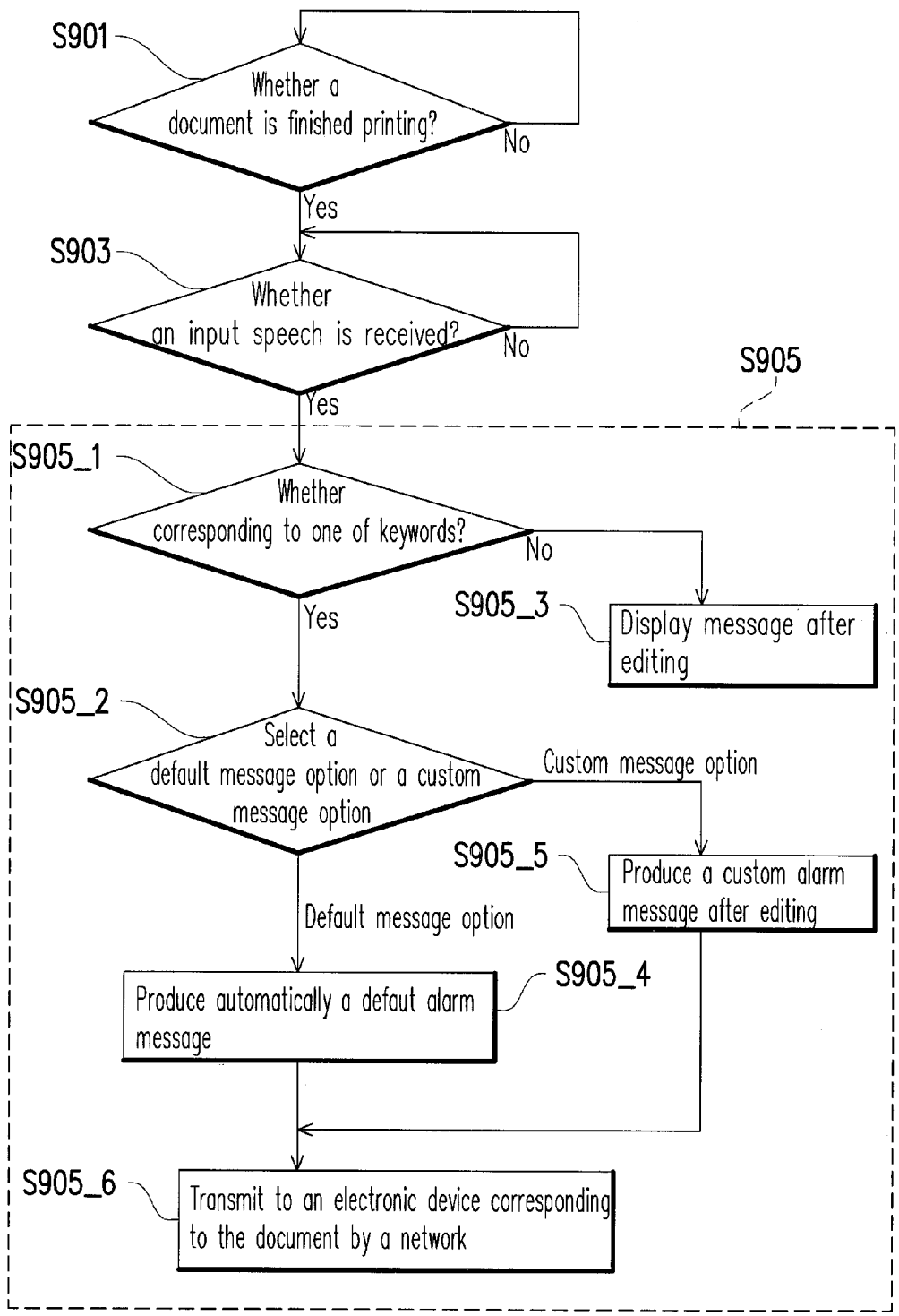
FIG. 9 is a flow chart of an alarm method applicable to a multi-function printer according to an embodiment of the invention.

Based on the disclosure/teaching of the above embodiments, FIG. 9 is a flow chart of an alarm method applicable to a multi-function printer (MFP) according to an embodiment of the invention. Referring to FIG. 9, the alarm method comprises the following steps.

It is continuously determined whether or not the MFP has accomplished printing a document (step S901).

When it is determined that the MFP has accomplished printing the document, then it is determined whether or not the MFP has received an input speech (step S903).

When the MFP has accomplished printing the document, and has received the input speech, then it is determined whether to produce an alarm message to an electronic device corresponding to the document in response to a comparison result between an input speech and a database (step S905).

In the embodiment, the alarm message produced in step S905 may be a default alarm message or a custom alarm message, and the database records a plurality of keywords. Under this condition, step S905 may further comprise the following sub-steps.

It is determined whether the input speech corresponds to one of the keywords recorded in the database (sub-step S905_1).

When it is determined that the input speech corresponds to one of the keywords recorded in the database, a default message option and a custom message option in a selection window is provided by the man-machine-interface (MMI) of the MFP for the user corresponding to the input speech to perform selecting (sub-step S905_2).

When it is determined that the input speech does not correspond to any of the keywords recorded in the database, then an edit window is further provided by the MMI for the user corresponding to the input speech to perform a message edit. After the message edit is completed, the MMI may display a message by a scrolling text style or a flickering style (sub-step S905_3).

On the other hand, when the user corresponding to the input speech selects the default message option, the default alarm message is automatically produced (sub-step S905_4).

When the user corresponding to the input speech selects the custom message option, the MMI further provides an edit window to the user corresponding to the input speech to perform a message edit. After the message edit is completed, the custom alarm message is produced (sub-step S905_5).

In response to the generation of the default or the custom alarm message, the default or the custom alarm message is transmitted to the electronic device corresponding to the document through a network (sub-step S905_6).

In summary, in the invention, by additionally equipping the speech recognition module into the MFP, when the MFP has accomplished printing a document and the printed document has not been taken away and is piled up in the paper output region of the MFP, in response to a satisfied condition of an input speech, a default alarm message can be automatically produced to the electronic device corresponding to the printed document, or a custom alarm message can be produced to the electronic device corresponding to the printed document from self-defining by user corresponding to the input speech. Even, a message can be self-defined by user and displayed by the MFP in response to a dissatisfied condition of the input speech. Accordingly, in response to the generation of the default/custom alarm message, or in response to the displayed message, not only to warn the user who forgot to take away the printed document (in this way, a situation that much of print documents/papers are piled up in the paper output region of the MFP 10 can be mitigated), but also further to indicate the location of the printed document (in this way, user can easily find his or her printed document).

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the present invention does not need to achieve all of the objects, advantages or features disclosed by the invention. Moreover, the abstract and the headings are merely used to aid in searches of patent files and are not intended to limit the scope of the claims of the invention.

What is claimed is:

1. A multi-function printer, comprising:
   a print module, adapted to print a document; and
   a speech recognition module, adapted to determine whether to produce an alarm message to an electronic device corresponding to the document in response to a comparison result between an input speech and a database when the document has finished printing.

2. The multi-function printer as claimed in claim 1, wherein the speech recognition module comprises:
   a storage unit, adapted to store the database, wherein the database records a plurality of keywords;
   an audio-receiving unit, adapted to receive the input speech; and
   a processing unit, coupled to the audio-receiving unit and the storage unit, adapted to compare whether the input speech corresponds to one of the keywords when the document has finished printing, so as to determine whether to produce the alarm message.

3. The multi-function printer as claimed in claim 2, wherein the alarm message is a default alarm message or a custom alarm message.

4. The multi-function printer as claimed in claim 3, wherein when the processing unit compares that the input speech corresponds to one of the keywords, the multi-function printer further comprises:

a man-machine-interface, adapted to provide a selection window for a user corresponding to the input speech to perform selecting, wherein the selection window has a default message option and a custom message option.

5. The multi-function printer as claimed in claim 4, wherein when the user selects the default message option, the processing unit automatically produces the default alarm message.

6. The multi-function printer as claimed in claim 5, wherein when the user selects the custom message option, the man-machine-interface further provides an edit window for the user to perform a message edit, and the processing unit produces the custom alarm message after the message edit is completed.

7. The multi-function printer as claimed in claim 6, further comprising:

a control module, adapted to be served as an operation core of the multi-function printer; and a network module, controlled by the control module, wherein the control module controls the network module to transmit the default alarm message or the custom alarm message to the electronic device corresponding to the document in response to the generation of the default alarm message or the custom alarm message.

8. The multi-function printer as claimed in claim 4, wherein when the processing unit compares that the input speech does not correspond to any of the keywords, the man-machine-interface further provides an edit window for the user to perform a message edit, and displays a message after the message edit is completed.

9. The multi-function printer as claimed in claim 2, wherein the audio-receiving unit is an omni-directional microphone or a uni-directional microphone.

10. The multi-function printer as claimed in claim 2, wherein the storage unit is a non-volatile memory.

11. The multi-function printer as claimed in claim 2, wherein the processing unit is a digital signal processor with speech processing functions.

12. An alarm method, applicable to a multi-function printer, the alarm method comprising:

determining whether the multi-function printer has accomplished printing a document; and when the multi-function printer has accomplished printing the document, determining whether to produce an alarm message to an electronic device corresponding to the document in response to a comparison result between an input speech and a database.

13. The alarm method as claimed in claim 12, wherein the alarm message is a default alarm message or a custom alarm message, the database records a plurality of keywords, and the step of producing the alarm message to the electronic device corresponding to the document comprises:

determining whether the input speech corresponds to one of the keywords; and when the input speech corresponds to one of the keywords, a selection window is provided by a man-machine-interface of the multi-function printer for a user corresponding to the input speech to perform selecting, wherein the selection window has a default message option and a custom message option.

14. The alarm method as claimed in claim 13, wherein when the user selects the default message option, the default alarm message is automatically produced.

15. The alarm method as claimed in claim 14, wherein when the user selects the custom message option, an edit window is further provided by the man-machine-interface for the user to perform a message edit, and the custom alarm message is produced after the message edit is completed.

16. The alarm method as claimed in claim 15, wherein the step of producing the alarm message to the electronic device corresponding to the document further comprises:

transmitting the default alarm message or the custom alarm message to the electronic device corresponding to the document through a network in response to the generation of the default alarm message or the custom alarm message.

17. The alarm method as claimed in claim 13, wherein when the input speech does not correspond to any of the keywords, an edit window is further provided by the man-machine-interface for the user to perform a message edit, and after the message edit is completed, a message is further displayed by the man-machine-interface.

\* \* \* \* \*